United States Patent Office 3,452,296
Patented June 24, 1969

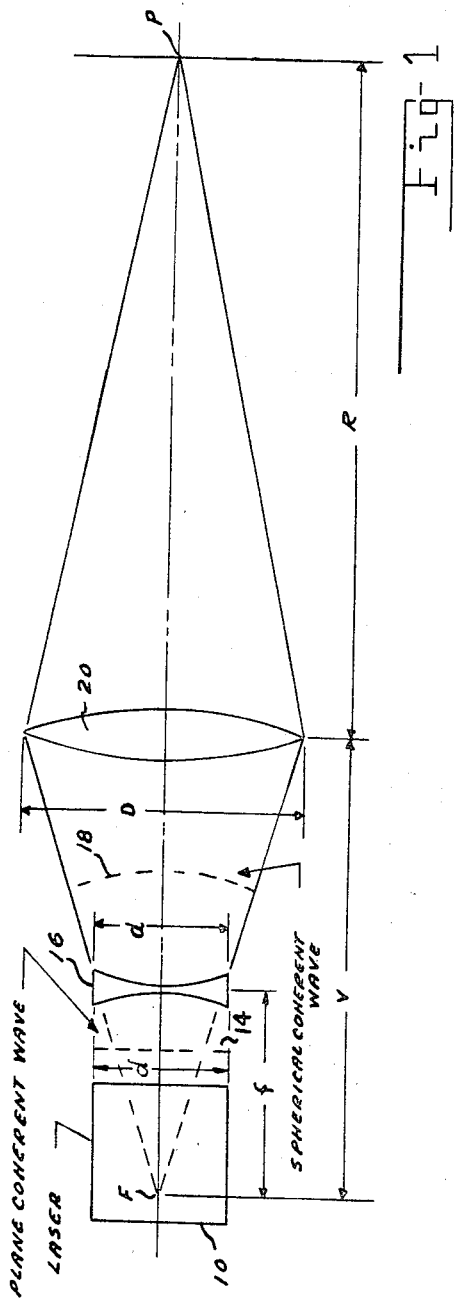

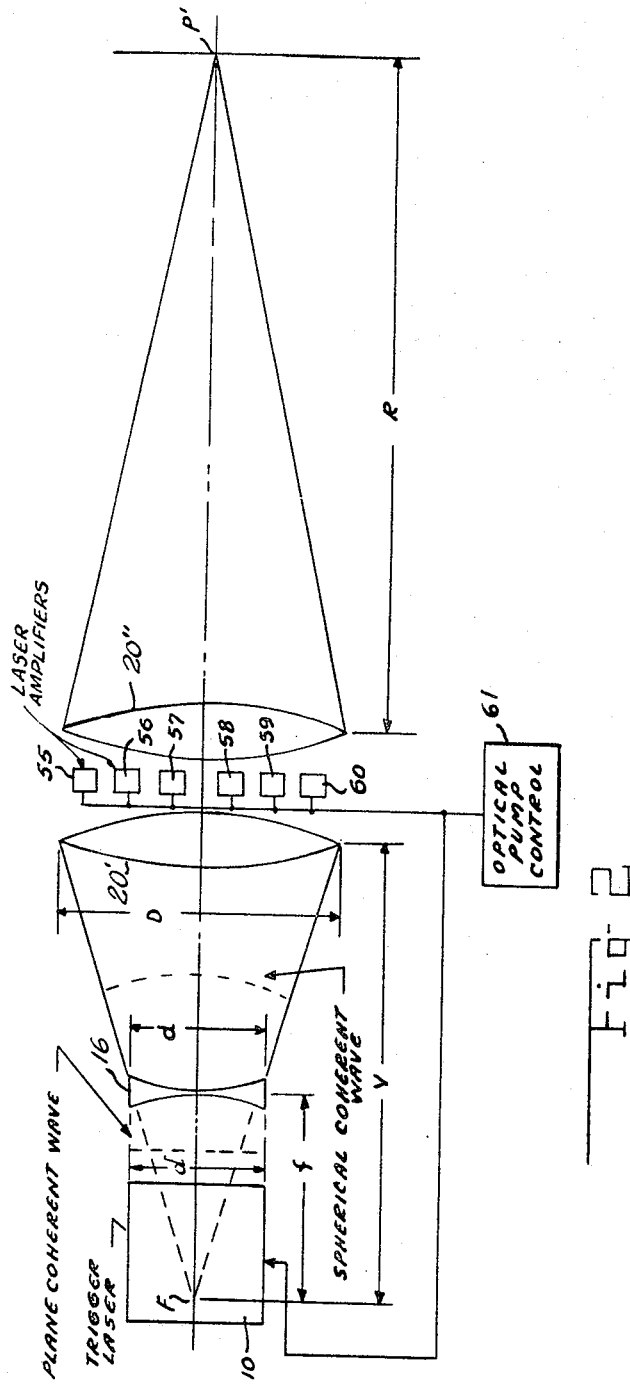

3,452,296
LASER SYSTEM FOR GENERATING COHERENT LIGHT
Arthur E. Lockenvitz and Charles R. Longwell, Austin, Tex., and Roy Pietsch, Melbourne, Fla., assignors to the United States of America as represented by the Secretary of the Air Force
Filed Apr. 20, 1965, Ser. No. 450,573
Int. Cl. H01s *3/02, 3/08;* A61n *5/06*
U.S. Cl. 331—94.5                                  2 Claims

ABSTRACT OF THE DISCLOSURE

Apparatus for producing high power density laser radiation at a given reception point comprising a laser having an exit aperture of diameter $d$, a diverging lens intercepting the laser output and a converging lens of diameter $D > d$ for bringing the diverging rays from the first lens to focus at the reception point, this arrangement reducing the diameter of the central disc of the Fraunhofer diffraction pattern at the reception point by the factor $d/D$ and increasing the power density by the factor $(D/d)^2$ as compared with the disc diameter and power density when a single converging lens is used to focus the laser output at the reception point. In a modification, the total radiation power brought to bear on the reception point is also increased by making the converging lens of two separate elements with an array of light amplifying lasers situated therebetween for augmenting the light before it reaches the second element, the lasers of the array being locked in phase by light received from the first laser.

This invention relates to lasers, an acronym for light amplification by the stimulated emission of radiation and, particularly, to laser systems for achieving extremely intense power densities at relatively great distances.

Presently used solid state lasers employ a solid crystalline element pumped optically by an intense light from a source surrounding the crystal. In applications involving large crystals, such as the familiar ruby rod, problems arise in simply and inexpensively producing the active material according to specifications. Also, as crystals become larger, a greater fraction of the pumping light is absorbed in the outer regions at the expense of the lasing action at the interior regions. Further, the difficulty in dissipating the heat generated during stimulated emission of radiation rises in direct proportion to the size of the crystal chosen.

Accordingly, an object of the invention is the improvement of laser devices.

Another object of the invention is to provide a high-power, high-density coherent laser beam effective over long distances.

A further object of the invention is to reduce the size of the Fraunhofer diffraction pattern of a laser beam.

Still another object of the invention is to lock a parallel array of lasers together in phase.

Yet another object of the invention is to increase the power density in the Fraunhofer diffraction pattern of an array of lasers.

Other objects and characteristic features of the invention will become apparent as the description proceeds.

In the accompanying drawings:

FIG. 1 treats of certain optical phenomena dealing with the passage of a laser beam through the optical system of the invention; and FIG. 2 shows another embodiment of the invention employing a parallel array of phase-locked lasers.

FIG. 1 illustrates how, in accordance with the invention, the power density at point P can be increased over what it would be were the output of laser 10 simply brought to focus at this point by a converging lens. As may be seen in any reference work on optics, for example, on page 304 of Fundamentals of Optics, Jenkins and White, McGraw-Hill Book Company, 1957, if a plane wave, i.e., a wave of parallel rays from a source apparently at infinity, is intercepted by a converging lens and brought to focus at a point, the rays do not all pass through the focal point but form at that point a Fraunhofer diffraction pattern consisting of a central bright disc surrounded by alternate dark and light rings, the radius $r$ of the central disc being given by the expression $$r = 1.22 \frac{\lambda f}{d} \quad (1)$$

where $\lambda$ is the wavelength of the light, $d$ is the effective diameter of the lens and $f$ is the focal length of the lens. Since the output rays of a laser are essentially parallel and travel with a plane wave front 14, bringing these rays to focus by a converging lens would also produce a Fraunhofer diffraction pattern defined by Equation 1. Thus, if lenses 16 and 20 of FIG. 1 were replaced by a converging lens of focal length R, there would be formed at point P a Fraunhofer diffraction pattern in which the radius of the central disc would be, in accordance with Equation 1, $$r_1 = 1.22 \frac{\lambda R}{d} \quad (2)$$

where $d$ again is the effective diameter of the lens, i.e., the diameter of the exit aperture of the laser, or the diameter of the solid cylinder of light emerging from the laser.

FIG. 1 illustrates how the radius of the central disc of the diffraction pattern at point P can be reduced below the value $r_1$ given by Equation 2 with a corresponding increase in power density at that point. In accordance with the invention, the light emerging from laser 10 is first intercepted by a diverging lens 16 having a relatively short focal length $f$ and an effective diameter $d$ as determined by the laser aperture. As stated earlier, the rays emerging from the laser and intercepted by lens 16 are parallel and therefore appear to come from a point at infinity. Lens 16 forms a virtual image of this point at the focal point F. As in the case of a converging lens, this virtual image is not a point but is a Fraunhofer diffraction pattern, although in this case the diffraction pattern is virtual rather than real. The radius of its central disc, as in the case of the real pattern formed by a converging lens, is given by Equation 1.

The rays passing through lens 16 appear to come from the above virtual diffraction pattern at point F and therefore diverge with a spherical wave from 18. These rays are intercepted by a converging lens 20 of effective diameter D and brought to focus by this lens at point P, forming an image of the diffraction pattern at point F at this point. The focal length of lens 20 is less than the object distance $v$ as required to form an image at P.

The ratio of the radius $r_2$ of the central disc of the diffraction pattern at point P to the radius $r$ of the central disc of the diffraction pattern at point F, as given by Equation 1, is $$\frac{r_2}{r} = \frac{R}{v} \quad (3)$$

Therefore, substituting the value of $r$ from Equation 1 in Equation 3, $$r_2 = 1.22 \frac{\lambda f}{d} \cdot \frac{R}{v} \quad (4)$$

By similar triangles, it is seen from FG. 1 that $$\frac{f}{d} = \frac{v}{D} \quad (5)$$

Therefore, substituting (5) in (4), $$r_2 = 1.22 \frac{\lambda R}{D} \quad (6)$$

Comparing this equation with Equations 1 and 2 for Fraunhofer diffraction patterns shows that $r_2$ is the radius of the central disc of a Fraunhofer diffraction pattern produced at the distance R by a converging lens of effective diameter D. Dividing Equation 6 by Equation 2 gives $$r_2 = r_1 \frac{d}{D} \quad (7)$$

which shows that the radius of the central disc of the diffraction pattern in the system of FIG. 1 is less than the radius of the central disc of the diffraction pattern produced by a single converging lens of effective diameter $d$ by the factor $d/D$.

Taking a numerical example, if $d=1$ cm. and $D=100$ cm., the radius is reduced by a factor of 1/100 and the area of the central disc by a factor of 1/10,000. Since the total power is the same in either case, the power density is increased by a factor of 10,000. The system of FIG. 1 is therefore much more effective in increasing the power density of a laser beam than conventional focusing methods.

FIG. 2 shows a modification of the system of FIG. 1 which, in addition to retaining the power density increasing ability of FIG. 1 as already explained, also achieves an increase in the total power brought to bear on the reduced diffraction pattern. The system differs from that in FIG. 1 only with respect to that part corresponding to converging lens 20 in FIG. 1. In FIG. 2 lens 20 is composed of two converging components 20' and 20'' spaced apart to receive an array of laser amplifiers 55–60. The focal length of lens 20' is $v$ and that of lens 20'' is R. While these focal lengths may differ, the focal length of the two lenses together equals the focal length of lens 20 in FIG. 1. With this arrangement a plane wave front with rays parallel to the optic axis exists between lenses 20' and 20''. In the space between the lenses is situated an array of lasers aligned parallel to each other some of which are represented by the blocks 55–60. Each block represents a laser complete with optical pumping means which may be triggered from control circuit 61 just after the triggering of the pumping means of laser 10 so that the lasers of the array receive light from laser 10 just prior to and during their optical pumping. A single optical pumping means for all the lasers of the array may also be used. The frequency of the characteristic emission for all the lasers, including laser 10, is the same. The result is that light from laser 10 entering all the lasers of the array locks them in phase so that their outputs are coherent in phase and constitute a coherent plane wave traveling toward lens 20''. Lens 20'' brings this energy to focus at point P in a Fraunhofer diffraction pattern the radius and area of the central disc of which are less than those of the diffraction pattern that would be produced by a single converging lens of effective diameter $d$ by the fractions $d/D$ and $(d/D)^2$, respectively, as explained for FIG. 1. The power density in FIG. 2 is therefore increased over that in FIG. 1 in direct proportion to the augmentation of laser output power by the parallel laser array. In this respect the lasers in the array may be considered light amplifiers.

The following numerical examples illustrate the advantages of the systems of FIGS. 1 and 2:

Consider first a conventional system in which a 10 kw. laser having an exit aperture $d=1$ cm. is focused at a distance $R=100$ kilometers by a single converging lens.

From Equation 2 the radius $r_1$ of the central disc of the diffraction pattern for $\lambda = 7 \times 10^{-5}$ cm. is $$r_1 = \frac{1.22 \times 7 \times 10^{-5} \times 10^7}{1} = 854 \text{ cm.}$$

the area $A_1$ of the central disc is $$A_1 = \pi(854)^2 = 229 \times 10^4 \text{ cm.}^2$$

and the power density is $$\frac{10^4}{229 \times 10^4} = .0044 \text{ watt/cm.}^2$$

Next consider the system of FIG. 1 under the same conditions and for $D=100$ cm. The radius $r_2$ of the central disc is, from Equation 6, $$r_2 = \frac{1.22 \times 7 \times 10^{-5} \times 10^7}{100} = 8.54 \text{ cm.}$$

This disc area $A_2$ is $$A_2 = \pi(8.54)^2 = 229 \text{ cm.}^2$$

and the power density is $$\frac{10^4}{229} = 44 \text{ watts/cm.}^2$$

Finally consider the system of FIG. 2 in which the array comprises 100 10 kw. lasers. The disc area for this case is the same as given above for FIG. 1. Therefore the power density is $$\frac{100 \times 10^4}{229} = 4400 \text{ watts/cm.}^2$$

We claim:
1. Apparatus for producing a high radiation power density at a given distant point comprising: a laser having an optical axis which, when extended, passes through said point, said laser emitting, through a circular exit aperture of diameter $d$ concentric with said axis, light with rays parallel to said axis; a diverging lens, having its optical axis coincident with the laser axis and having a diameter not less than $d$, positioned to intercept the parallel rays from the laser and to cause them to diverge in a solid cone of light; and a converging lens, having its optical axis coincident with the laser axis and having a diameter not less than a value D larger than $d$ such that the factor $(D/d)^2$ represents the desired power density increase over the power density that would be produced by a converging lens alone, positioned at the distance from said diverging lens where the diameter of the circular section of the cone is D, for bringing the diverging rays from said diverging lens to focus at said point.

2. Apparatus for producing a high radiation power density at a given distant point comprising: a laser having an optical axis which, when extended, passes through said point, said laser emitting, through a circular exit aperture of diameter $d$ concentric with said axis, light with rays parallel to said axis; a diverging lens, having its optical axis coincident with the laser axis and having a diameter not less than $d$, positioned to intercept the parallel rays from the laser and to cause them to diverge in a solid cone of light; a first converging lens, having its optical axis coincident with the laser axis and having a diameter not less than a value D larger than $d$ such that the factor $(D/d)^2$ represents the desired power density increase over the power density that would be produced by a converging lens alone, positioned at a distance from said diverging lens where the diameter of the circular section of the cone is D, for bringing the diverging rays from said diverging lens into parallelism with the laser axis; a second converging lens, having its optical axis coincident with the laser axis and having a diameter not less than D, and spaced from said first converging lens, said second converging lens acting to bring the parallel rays from the first converging lens to focus at said point; and an array of lasers in the space between said first and second converging lenses acting as light amplifiers, said lasers having their optical axes parallel to the axis of the first named laser and being locked in phase by the light from said first named laser received from said first converging lens.

References Cited

UNITED STATES PATENTS

| | | | |
|---|---|---|---|
| 853,812 | 5/1907 | Lomb | 350—232 XR |
| 2,388,077 | 10/1945 | Reardon et al. | 350—232 |
| 3,096,767 | 7/1963 | Gresser et al. | 331—94.5 XR |
| 3,247,467 | 4/1966 | Geusic et al. | 331—94.5 |
| 3,289,101 | 11/1966 | Masters et al. | 330—4 |
| 3,292,102 | 12/1966 | Byrne | 330—4 |
| 3,312,905 | 4/1967 | Lewis | 330—4.3 |
| 3,335,285 | 8/1967 | Gally et al. | 331—94.5 |

RONALD L. WIBERT, *Primary Examiner.*

T. R. MOHR, *Assistant Examiner.*

U.S. Cl. X.R.

128—395